Figure 1:
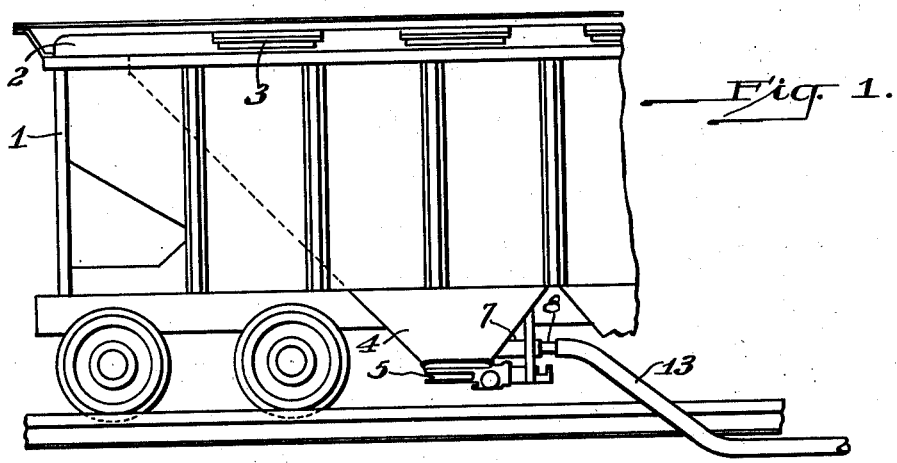

Feb. 20, 1940. J. C. McKENNA 2,190,727
UNLOADING FREIGHT CARS
Filed March 24, 1939

INVENTOR.
James Cline McKenna
BY Brown, Critchlow & Flick
his ATTORNEYS.

Patented Feb. 20, 1940

2,190,727

UNITED STATES PATENT OFFICE 2,190,727

UNLOADING FREIGHT CARS

James Cline McKenna, Pittsburgh, Pa., assignor to Diamond Alkali Company, Pittsburgh, Pa., a corporation of Delaware Application March 24, 1939, Serial No. 263,881

2 Claims. (Cl. 214—44)

This invention relates to the unloading of freight cars containing bulk materials by suction, and more particularly to the connection of a suction conveyor with the hopper of a hopper bottom car which is to be unloaded.

Suction conveyor systems are now used widely for unloading bulk materials from, for example, railway cars. Almost any granular, crushed or finely divided material capable of flow can be handled in this manner, a few examples being grains, alum, borax, salt, soda ash, coal, silica, wood flour, lime, dried clays, and the like. Such a suction conveyor system includes a conveyor tube associated with a source of suction. The inlet end of this tube is generally in the form of a flexible hose provided with a nozzle that has an auxiliary air inlet spaced above its end for the purpose of permitting a steady air flow into the tube when the end of the nozzle is inserted in a pile of bulk material.

Such suction systems as applied heretofore to the unloading of railway cars have been open to certain disadvantages. Thus, if the workman who is manipulating the flexible hose in unloading a box car, for example, inserts the nozzle too deeply into the pile of material, either inadvertently or to hasten the unloading operation, the auxiliary air inlet may become covered by the material. The consequent retardation or stoppage of the air flow automatically shuts off the suction apparatus which is generally located a considerable distance from the material being unloaded, so that time is consumed in placing the system in operation again, thus slowing down the unloading operation. The workman, not wishing to be put to the trouble of walking back to the suction apparatus to start it again, generally tries to make sure that he does not stall the system by keeping the auxiliary air inlet of the nozzle well out of the pile of material. However, this results in the nozzle being not extended into the pile of material to the optimum distance, wherefore the unloader does not operate at its rated capacity and the unloading time and expense are increased. In any event, such hand-controlled operations are variable and the feed is irregular so that not only may the system be underloaded part of the time, but also there may at intervals be surging which momentarily overloads the suction apparatus, thus adding to upkeep expenses. Another expense of this character comes from repair and replacement of the flexible hose which is constantly moved about and flexed during unloading.

Before shipping certain bulk materials in box cars the cars must be prepared to receive them, as by cleaning or sweeping the cars, and, in some cases, installing paper lining and dunnage. Ordinarily it is necessary to make provision for keeping the material away from the doors so that when they are opened it will not flow out. Even with such precautions, however, foreign substances may contaminate the material. For instance, splinters loosened from the car floor by the suction conveyor nozzle may enter the nozzle with the material from the car.

To eliminate such and other troubles and expense, and to minimize the likelihood of contamination by dirt and dust in transit, some amounts of bulk materials are shipped in closed cars provided with hopper bottoms. As it is not practicable to unload such cars by inserting the hose of a suction conveyor down through their hatches, the car contents are dumped through the hoppers into a trough or chute permanently installed beneath the tracks and provided with a screw conveyor. However, open conveyor troughs of this character have the disadvantage that they may accumulate dirt and water.

It is among the objects of this invention to provide for the suction unloading of hopper bottom cars directly from their hoppers. More specific objects are to provide means for connecting a car hopper directly to the inlet hose of a suction conveyor system which permits the hopper to be unloaded at the maximum capacity of the conveyor system, is a permanent part of the hopper, does not clog, does not stall the conveyor system, protects the bulk material from dirt and water, requires no attention during operation, and materially reduces unloading time as compared with the manual operation of unloading freight cars by suction.

In accordance with this invention the lower end of a car hopper is provided permanently with a tube projecting from one side for association with another tube connected to the hose of a suction conveyor system. This second, or conveyor, tube may be received inside of the first tube or connected to its end. In the first case the conveyor tube is preferably provided on its outer surface with a plurality of circumferentially spaced fins or like members that space it from the inner surface of the hopper tube to form an air inlet passage between them, or an ordinary suction conveyor nozzle may be inserted into the hopper tube. In the second case the hopper tube may be provided with an air inlet in its side wall, preferably controlled by a check valve. The hopper tube is provided with means for closing it when the conveyor hose is disconnected from it.

In this manner the conveyor is enabled to operate under uniform load and at maximum capacity because the lower portion of the hopper is continuously maintained full of material until the last, and the conveyor can not clog because there is no danger of plugging the air inlet.

Figure 2:
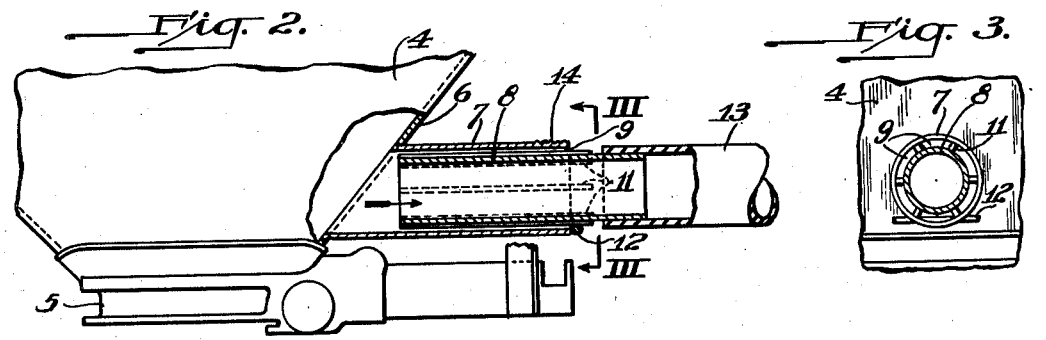
Figure 3:
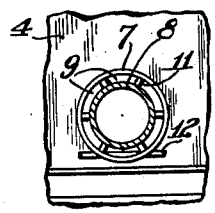
Figure 4:
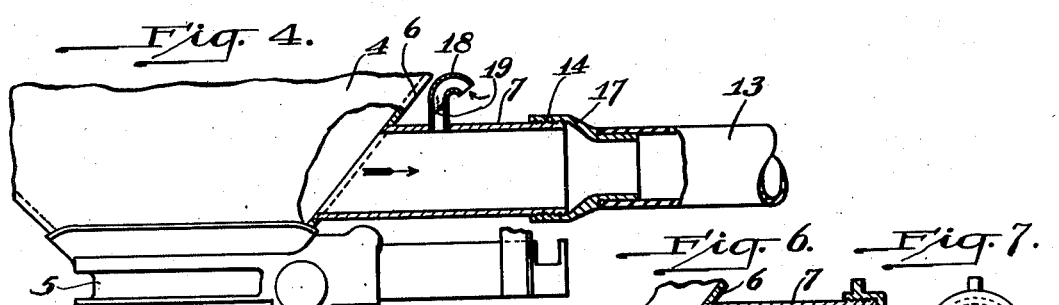
Figures 6, 7:
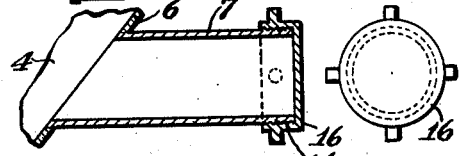
Figure 5:
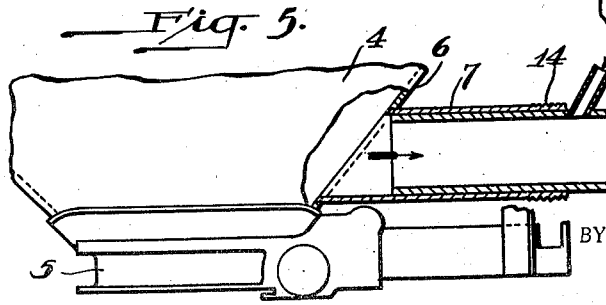

The invention is illustrated in the accompanying drawing in which Fig. 1 is a fragmentary side view of a closed hopper bottom car to which a suction conveyor conduit has been attached; Fig. 2 is an enlarged fragmentary view, partly in vertical section, of the hopper and conduit of Fig. 1; Fig. 3 is a fragmentary view taken on the line III—III of Fig. 2; Figs. 4 and 5 are views similar to Fig. 2 of two modifications of this invention; and Figs. 6 and 7 are vertical section and end views, respectively, of a closure for the hopper tube.

Referring to Fig. 1 of the drawing, a railway car 1 of the hopper type has a roof 2 provided with a plurality of hatchways normally sealed by removable hatches 3. The interior of the car is divided by partitions or bulk heads into several separate compartments each of which projects below the car sills in the form of a hopper 4 that terminates in the usual discharge outlet. The hopper outlet is normally closed by any one of various means, such as by a gate valve 5 provided with a horizontally sliding gate or door and requiring no detailed description herein.

It is a feature of this invention that bulk material within the car is conveyed by suction from the lower ends of its hoppers. Accordingly, extending outwardly from an opening in a side wall 6 (Fig. 2) of each hopper is a substantially horizontal tube 7 adapted to receive a smaller tube or nozzle 8 removably disposed therein. The two tubes are spaced apart to provide an air passage 9 (Fig. 3) between them, as by means of spacers carried by one of them, preferably by means of circumferentially spaced fins 11 extending longitudinally of the nozzle to the outer surface of which they are secured. The outer edges of these fins engage the inner surface of hopper tube 7 to space them concentrically. Insertion of the nozzle into the hopper tube may be limited in any convenient manner, as by a transverse rod 12 secured to the outer edges of a pair of fins as shown in Fig. 3.

When it is desired to unload a hopper car, such as shown in Fig. 1, nozzle 8, connected to the inlet hose 13 of a suction conveyer, is inserted in hopper tube 7. The air that is drawn into the nozzle by suction apparatus connected to conveyor hose 13 first flows through inlet passage 9 between the nozzle and hopper tube to the inner end of the latter. As this air enters the nozzle it draws bulk material from the hopper with it and delivers it to the desired remote location.

Before and after unloading of the car the hopper tube is closed by any suitable means in order to seal the hopper. One way of doing this is to provide the outer end of the tube with threads 14 adapted to receive a threaded cap 16, as shown in Figs. 6 and 7. The cap may be locked in place in any desired manner.

In the modified embodiment shown in Fig. 4 the outer end of the hopper tube 7 is provided with threads 14 for receiving not only a closure cap 16, but also a threaded coupling 17 connected to the end of the conveyor hose 13. This permits a rigid connection to be obtained between the hopper tube and hose and eliminates the necessity for the special type of nozzle shown in Fig. 2. However, it also eliminates any inlet air passage between nozzle and tube, so that provision for another air inlet must be made. Preferably, this inlet is formed in the top of the hopper tube from which a short pipe 18 extends upwardly. The upper end of the pipe 10 is curved downwardly to minimize the chance of foreign matter entering it. Disposed in this pipe is an upwardly biased check valve 19 that remains closed except when the suction conveyor is in operation. At that time air is drawn into the hopper tube through this valve in order to entrain bulk material from the hopper and carry it into the conveyor hose.

The modification shown in Fig. 5 discloses another way in which hopper tube 7 can be connected to a suction conveyor hose. In this case the hose is provided with a conventional type of nozzle 21 having the usual auxiliary air inlet 22 spaced from its outer end. To unload the car this nozzle is merely inserted in the hopper tube in which it may fit more or less snugly. This manner of utilizing the invention is the simplest because such a nozzle is generally found wherever suction conveyor systems of this type are used.

A major advantage of a hopper bottom car constructed in accordance with this invention is that the tube by which the hopper is connected with a suction conveyor is a unitary and permanent part of the car. This means that the car can be unloaded by suction, whenever there is a suction conveyor system, without requiring extra adapters between hopper and nozzle for connecting the conveyor to the hopper. Also, no time and labor is required for fastening an adapter to the hopper. On the other hand, the hopper tube does not obstruct the normal outlet of the hopper in case it is desired to empty the car in the usual manner by opening the hopper gate. The material being removed from the hopper by suction is not exposed to dirt and water during unloading because it flows directly from the hopper through the hopper tube to the conveyor hose. Manipulation of the conyevor hose and nozzle during unloading is entirely eliminated. In addition to permitting the conveyor system to operate at full capacity all of the time, my invention eliminates harmful surging in the system due to irregular feed.

By the use of this invention a car load of soda ash, for example, can be unloaded in about three-quarters of the time required to unload the same amount of like material from a box car by the conventional hand manipulated nozzle of a suction conveyor system.

According to the provisions of the patent statutes, I have explained the principle and mode of operation of my invention and have illustrated and described what I now consider to represent its best embodiment. However, I desire to have it understood that, within the scope of the appended claims, the invention may be practiced otherwise than as specifically illustrated and described.

I claim:

1. The combination with a railway car having an integral discharge hopper below its body provided with a bottom discharge door, of a tube member rigidly associated with and projecting out of one side of the hopper and adapted to slidably receive a nozzle member of a suction conveyor system, the wall of the hopper being closed except for said tube, one of said members being provided with means spacing said nozzle from said tube to provide an air inlet therebetween and one of said members being provided with means for limiting the distance the nozzle can be inserted into the tube, and means for closing the opening through said first tube when not in use.

2. The combination with a railway car having an integral discharge hopper below its body provided with a bottom discharge door, of a straight tube permanently connected to one side of the hopper and projecting laterally therefrom, the wall of the hopper being closed except for said tube, a suction conveyor nozzle slidably mounted in said tube, a plurality of circumferentially spaced members secured to the outer surface of the nozzle to space it from the inner surface of the tube and thereby form an air inlet passage between them, means for limiting the distance that the nozzle can be inserted in the tube, and means for closing the opening through the tube when the nozzle is withdrawn.

JAMES CLINE McKENNA.